United States Patent

Hertrich et al.

[11] Patent Number: 6,157,516
[45] Date of Patent: Dec. 5, 2000

[54] METHOD AND APPARATUS FOR PREVENTING ELECTROSTATIC DAMAGE TO THE READ/WRITE HEAD OF A TAPE DRIVE

[75] Inventors: Gregory P. Hertrich, Longmont; Larry Albrecht, Louisville, both of Colo.

[73] Assignee: Quantum Corp., Milpitas, Calif.

[21] Appl. No.: 09/191,362

[22] Filed: Nov. 13, 1998

[51] Int. Cl.[7] .............................. G11B 5/41; G11B 21/02
[52] U.S. Cl. ...................................... 360/128; 360/261.3
[58] Field of Search .................................. 360/106, 128, 360/129, 261.1, 261.3, 323

[56] References Cited

U.S. PATENT DOCUMENTS

| | | | |
|---|---|---|---|
| 4,356,524 | 10/1982 | Watanabe | 360/129 |
| 4,609,959 | 9/1986 | Rudi | 360/106 |
| 4,943,877 | 7/1990 | Cannon et al. | 360/106 |
| 5,469,318 | 11/1995 | Inoue et al. | 360/128 |
| 5,475,548 | 12/1995 | Rudi et al. | 360/96.5 |
| 5,537,275 | 7/1996 | Peace et al. | 360/106 |

FOREIGN PATENT DOCUMENTS

| | | |
|---|---|---|
| 61-104473 | 5/1986 | Japan . |
| 5-67318 | 3/1993 | Japan . |

*Primary Examiner*—David L. Ometz
*Attorney, Agent, or Firm*—Beyer Weaver & Thomas

[57] ABSTRACT

Methods and apparatus for reducing electrostatic discharge damage to a read/write (R/W) head attached to a shutter/head assembly are disclosed. In accordance with one aspect of the present invention, a shutter/head assembly includes a lead screw, a head housing, and a shutter. The head assembly is configured to be coupled to a R/W head, and is rotatably coupled with the lead screw. The shutter is also rotatably coupled to the lead screw, but in such a manner that the shutter is able to rotate independently of the head housing. The shutter is also configured in such a manner so that it rotates to a radial position between the R/W head and the tape/leader ribbon when the lead screw brings the shutter toward a certain linear position, and rotates to another radial position away from the R/W head and the tape/leader ribbon when the lead screw brings the shutter toward a different linear position.

20 Claims, 4 Drawing Sheets

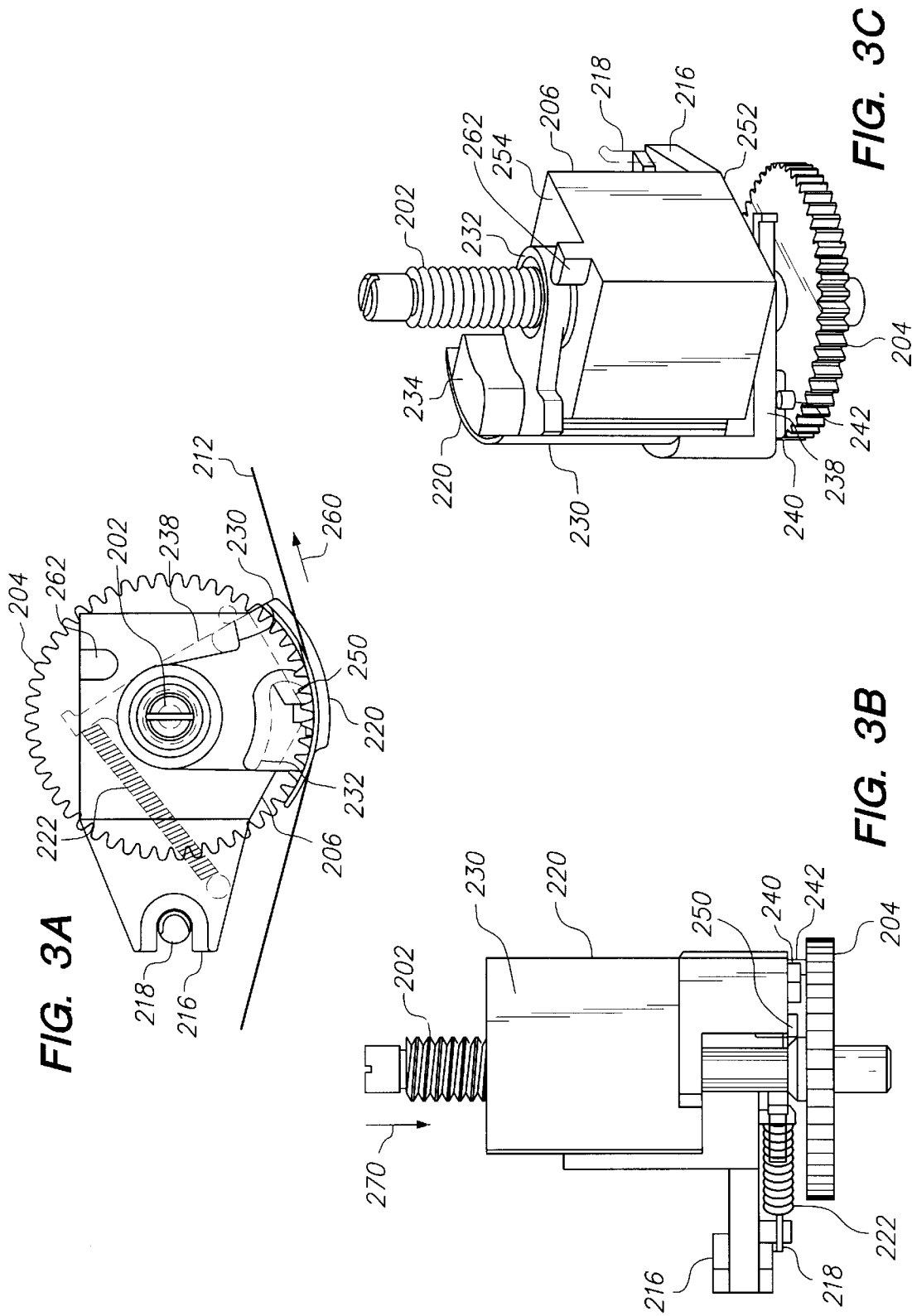

METHOD AND APPARATUS FOR PREVENTING ELECTROSTATIC DAMAGE TO THE READ/WRITE HEAD OF A TAPE DRIVE

BACKGROUND OF THE INVENTION

The present invention relates generally to methods and apparatus for preventing electrostatic damage to and for cleaning a read/write (R/W) head of a tape drive. More particularly, the present invention relates to an improved tape head shutter mechanism that protects the R/W head from electrostatic discharge (ESD) damage. Also, as the leader buckle passes over the head, physical damage to the head can result. This is the case for MR (magneto-resistive) heads, ferrite heads and metal-in-gap (MIG) heads. This physical damage may not affect the read or write elements but can result in a shorter life of the tape.

Electrostatic discharge is a major concern in the use of R/W heads in tape drives. This is true of all R/W heads in general but is particularly true in the case of magneto-resistive (MR) heads, which are generally used in modern high density tape technology. In some tape drives, the leader, which is spliced to the tape on the cartridge and is used to connect the drive reel to the cartridge, builds up static charge from moving friction, thereby creating electrostatic discharge problems that would sometimes destroy the head when the leader comes in contact with it. Furthermore, the heads may sometimes be scratched by the leader material when the leader material is allowed to directly contact the head during tape operation.

To facilitate discussion, FIG. 1a is a diagrammatic top view representation of a R/W head 100 which is shown to be in moving contact with a tape/leader ribbon 102 traveling along the tape path. The tape/leader ribbon comprises of a leader segment 102a spliced onto a tape segment 102b. The leader segment is typically made of a conventional leader material, such as polyethylene terepthalate (PET) or another suitable leader material that is conventional in nature. The leader material tends to be stronger than tape and may, for example, have an approximate thickness of 0.007 in. in comparison with the tape thickness of 0.0005 in. As is well known, the leader serves the purpose of allowing the tape/leader ribbon to be taken up onto the drive reel so that the drive reel can be connected to the cartridge.

FIG. 1b is a diagrammatic side view representation of a tape/leader ribbon 104 traveling over a R/W head 106. Hidden lines 108 depict the part of the tape/leader ribbon that comes in contact with the R/W head and is blocked from view in the illustration of FIG. 1b.

The leader material is susceptible to charge accumulation, for example, when the cartridge made of a non-conductive material is removed from the tape drive and comes in contact with other surfaces. The accumulated electrostatic charge may discharge through the R/W head, thereby causing severe damage to the R/W head. In particular, MR heads are found to be especially vulnerable to ESD damage.

In view of the foregoing, what is desired is a method and an apparatus for protecting the R/W head during tape operation. More particularly, what is desired is a method and an apparatus for protecting the R/W head from electrostatic discharge damage and physical damage that is caused by moving contact between the R/W head and the tape leader material.

SUMMARY OF THE INVENTION

The invention relates to methods and apparatus for reducing electrostatic discharge damage to a read/write (R/W) head attached to a shutter/head assembly. The R/W head is configured to perform storage or retrieval operations on data stored on a tape/leader ribbon.

In accordance with one aspect of the present invention, a shutter/head assembly includes a lead screw, a head housing, and a shutter. The head assembly is configured to be coupled to a R/W head, and is rotatably coupled with the lead screw. The shutter is also rotatably coupled to the lead screw, but in such a manner that the shutter is able to rotate independently of the head housing. The shutter is also configured in such a manner so that it rotates to a radial position between the R/W head and the tape/leader ribbon when the lead screw brings the shutter toward a certain linear position, and rotates to another radial position away from the R/W head and the tape/leader ribbon when the lead screw brings the shutter toward a different linear position.

In accordance with another aspect of the present invention, a method for reducing electrostatic discharge damage to a read/write (R/W) head attached to a shutter/head assembly is disclosed. This method includes the acts of providing a lead screw and a head housing that is configured to be coupled a read/write head, rotatably coupling the head housing to the lead screw, providing a shutter, and rotatably coupling the shutter to the lead screw so that the shutter can rotate independently of the head housing and can move in a radial direction towards and away from a position between the R/W head and the tape/leader ribbon.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which:

FIG. 3a shows a diagrammatic top view of the shutter/head assembly arrangement with the leader portion of the tape/leader ribbon traveling over the R/W head and the shutter in a closed position in accordance with one embodiment of the present invention.

FIG. 3b shows a diagrammatic side view of the shutter/head assembly arrangement with the shutter in a closed position in accordance with one embodiment of the present invention.

FIG. 3c shows a diagrammatic projected back view of the shutter/head assembly arrangement with the shutter in a closed position in accordance with one embodiment of the present invention.

DETAILED DESCRIPTION OF THE EMBODIMENTS

The present invention will now be described in detail with reference to a few preferred embodiments thereof as illustrated in the accompanying drawings. In the following description, numerous specific details are set forth in order to provide a thorough understanding of the present invention. It will be obvious, however, to one skilled in the art, that the present invention may be practiced without some or all of these specific details. In other instances, well known structures and process steps have not been described in detail in order not to unnecessarily obscure the present invention.

In accordance with one aspect of the present invention, a method for preventing electrostatic discharge damage to a R/W head in a tape drive is disclosed. A shutter/head assembly including a shutter and a head housing is provided. The shutter is coupled to the head housing by a biasing arrangement that normally keeps the shutter open, i.e., not interposed between the tape/leader ribbon and the R/W head. A lead screw is also coupled to the shutter and the head housing, which share a common rotational axis that is coincident with the lead screw. A gear with a protrusion on it is coupled to the lead screw. By rotating the gear and the lead screw, the shutter/head assembly is brought toward the gear to engage the protrusion on the gear with the shutter, thereby inducing the shutter to rotate to a closed position, i.e., to interpose itself between a portion of the tape/leader ribbon and the R/W head.

To open the shutter, the gear and the lead screw are rotated in the reverse direction, thereby moving the shutter/head assembly away from the gear to allow the shutter to disengage from the protrusion on the gear and return to its open position.

Figure 1A:
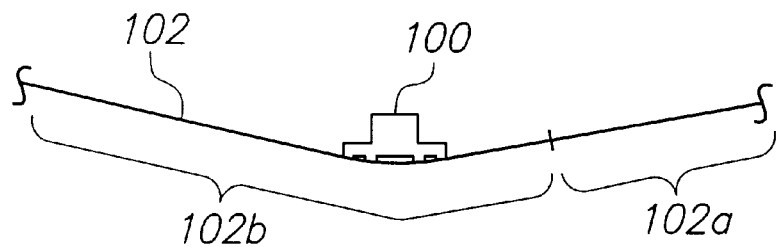
FIG. 1a shows a diagrammatic top view of a tape/leader ribbon traveling over a R/W head.
Figure 1B:
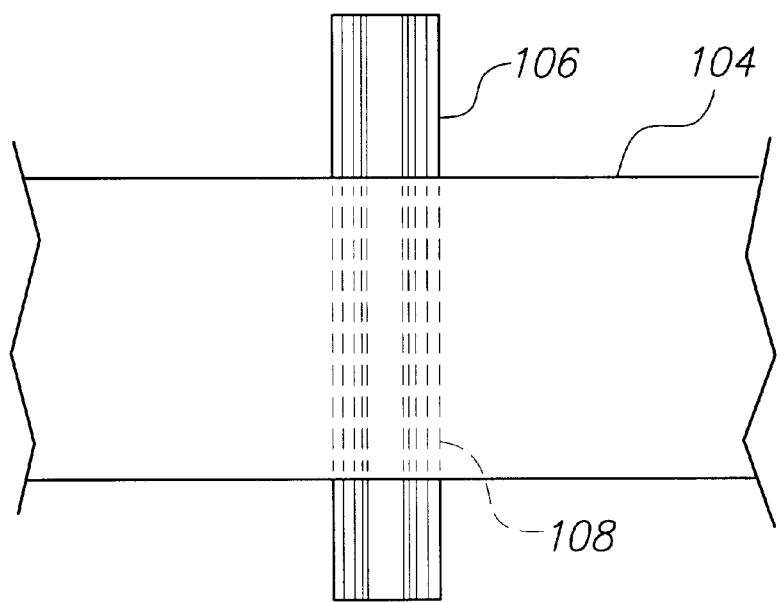
FIG. 1b shows a diagrammatic side view of a tape/leader ribbon traveling over a R/W head.
Figure 2B:
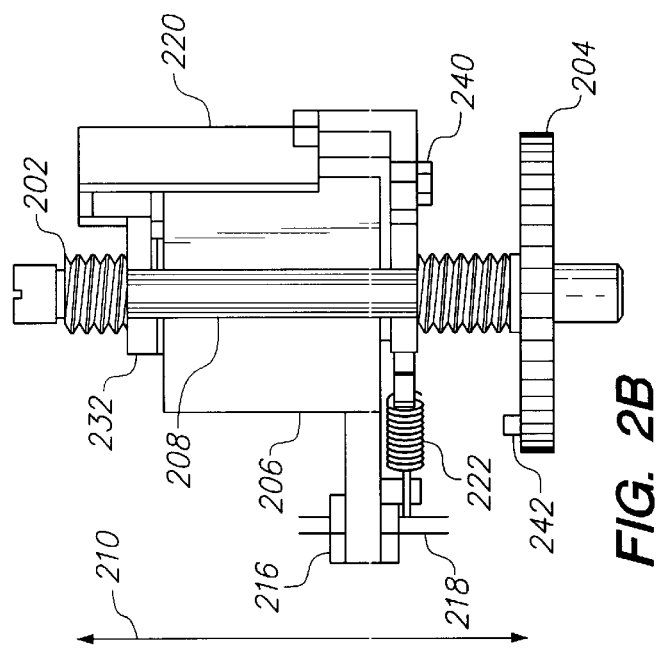
FIG. 2b shows a diagrammatic side view of the shutter/head assembly arrangement with the shutter in an open position in accordance with one embodiment of the present invention.
Figure 2A:
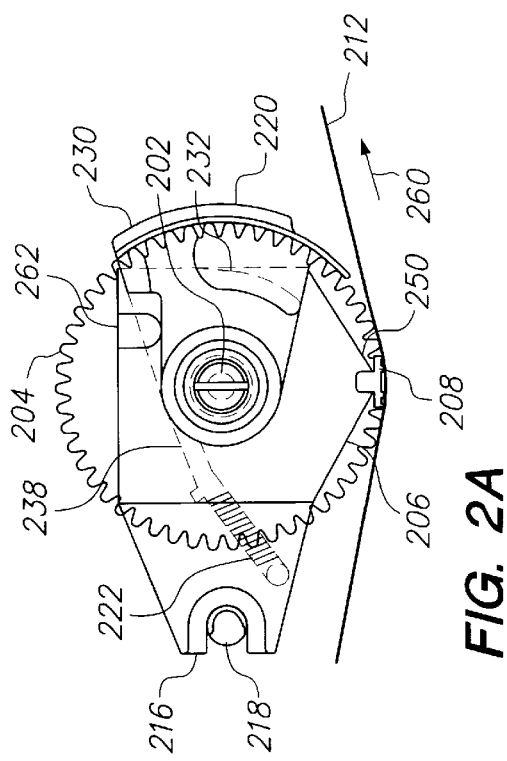
FIG. 2a shows a diagrammatic top view of the shutter/head assembly arrangement with the tape portion of the tape/leader ribbon traveling over the R/W head and the shutter in an open position in accordance with one embodiment of the present invention.
Figure 2C:
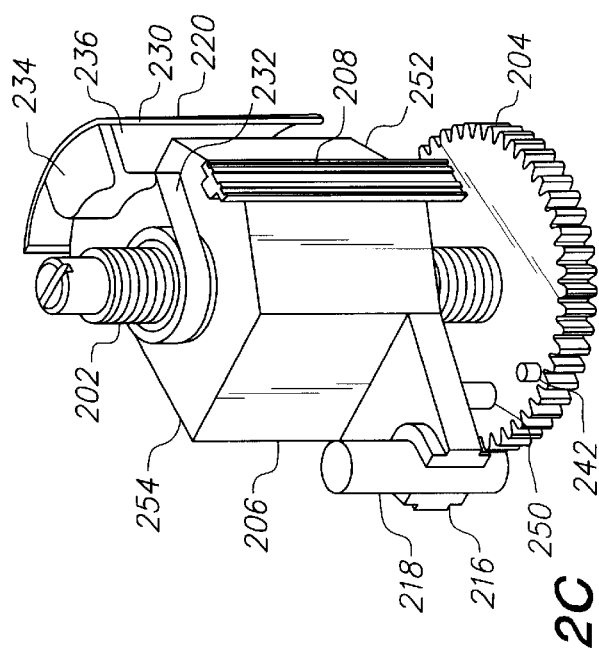
FIG. 2c shows a diagrammatic projected front view of the shutter/head assembly arrangement with the shutter in an open position in accordance with one embodiment of the present invention.

The features and advantages of the invention may be better understood with reference to the figures and discussions that follow. FIGS. 2A, 2B, and 2C are three different views of the shutter/head assembly, including a tape/leader ribbon while the shutter is in its open position. As the term is employed herein, the shutter is in its open position when it is not disposed in between the R/W head and the tape/leader ribbon.

Referring initially to FIGS. 2A and 2B, there is shown a lead screw 202, which is coupled to a gear 204. In the example of FIGS. 2A–2C, lead screw 202 is configured to be a left hand screw although such is not an absolute requirement of the present invention. Gear 204 is fixedly coupled to lead screw 202 so that when gear 204 is rotated (by a stepper motor or any suitable motor, which is not shown in the figures to simplify the illustration), lead screw 202 is rotated along with it.

A head housing 206 is rotatably coupled to lead screw 202. Head housing 206 is configured to be coupled to a R/W head (shown by reference number 208 in FIG. 2C) to provide mechanical support for R/W head 208. When lead screw 202 rotates, head housing 206 (and the attached R/W head) is moved along the rotational axis of the lead screw (in the direction of arrow 210). To prevent head housing 206 from rotating along with lead screw 202, the rotation of head housing 206 may be constrained while allowing head housing 206 to move freely along the direction of arrow 210. By way of example, head housing 206 may include a slot 216 which engages a pin 218 to allow head housing 206 to move in the direction of arrow 210 along pin 218 without rotating. As can be appreciated by those skilled in the art, moving R/W head 208 in this manner permits the R/W head to access the different tracks on the data bearing tape of tape/leader ribbon 212.

A shutter 220 is also rotatably coupled to lead screw 202. However, shutter 220 is permitted to rotate independently from head housing 206. By way of example, shutter 220 may be coupled to bushings mounted on head housing 206 to allow shutter 220 to rotate even though the rotational movement of head housing 206 is constrained as discussed earlier. Shutter 220 is preferably made of a conducting material that does not charge up the leader material such as magnesium casting, aluminum casting, or electrically conductive plastic. Plating may be required such that the shutter material does not affect the recording surface of the tape media, i.e., transfer contaminants to the recording surface. However, as long as shutter 220 provides an alternate electrical path to ground to allow any charge on tape/leader ribbon 212 to discharge through shutter 220, shutter 220 may be made of any suitable material and in any suitable configuration. In one embodiment, shutter 220 includes a cleaning material attached to the surface of shutter 220 that is disposed toward R/W head 208 to allow shutter 220 to clean R/W head 208 each time shutter 220 is moved to its closed position.

In the example of FIGS. 2A–2C, shutter 220 is kept in its open position by some biasing arrangement, such as by extension spring 222. For the purpose of biasing shutter 220 in its open position, extension spring 222 is coupled to shutter 220 and a suitable position on head housing 206. However, other biasing arrangement such as leaf springs, compression springs, torsion springs, or magnetic biasing arrangements may also be employed. The selection of a suitable biasing arrangement, as well as its location, is readily apparent to those skilled in the art given this disclosure.

As shown in the example of FIGS. 2A–2C, a representative configuration of shutter 220 comprises of a shutter shield 230 coupled at its top edge to a collar 232 where the shutter 220 is rotatably coupled to head housing 206 or lead screw 202. Collar 232 has a raised section 234 where it is coupled to shutter shield 230 provide a space 236 for clearance as shutter shield 230 rotates around in front of R/W head 208. Shutter shield 230 is also coupled at one bottom corner to a rotating arm 238 where shutter 220 is coupled to extension spring 222.

It should be readily apparent to those skilled in the art given this disclosure that other configurations of shutter 220 may also be employed in the invention. For example, the raised section 234 providing the clearance space 236 can be eliminated in this particular shutter configuration if the R/W head 208 is positioned such that the R/W head 208 does not protrude above the top surface of head housing 206.

The operation of shutter 220 will now be discussed in reference to FIGS. 3A–3C and by the comparison between these figures with the earlier FIGS. 2A–2C. FIGS. 3A, 3B, and 3C are three different views of the shutter/head assembly shown while shutter 220 is in its closed position. As the term is employed herein, shutter 220 is in its closed position when it is disposed in between R/W head 208 and tape/leader ribbon 212 to protect R/W head 208 from ESD damage and/or to clean R/W head 208.

In general, shutter 220 is moved to its closed position when shutter 220 is moved to a linear position along the rotational axis that allows the shutter or a protrusion on the shutter to be engaged by a protrusion on rotating gear 204. The engagement of the protrusion on shutter 220 (shown in the example of FIGS. 2B and 2C as a protrusion 240) with the protrusion on rotating gear 204 (shown as a protrusion 242 in FIGS. 2B and 2C) allows shutter 220 to be rotated to a closed position. Note that in its closed position, the shutter is in a radial position that is different from the radial position of the open position.

With reference to FIGS. 3B and 3C, the closing of the shutter is achieved when lead screw 202 is rotated in a clockwise direction when viewed from the direction of arrow 270 to bring shutter 220 (along with head housing 206) linearly toward gear 204 to allow protrusion 242 to engage with protrusion 240. In the example of FIGS. 3A–3C, extension spring 222 is extended further when shutter 220 is rotated to its closed position, thus providing a torque on shutter 220 in the counterclockwise direction. However, the engagement of protrusions 240 and 242 prevents shutter 220 from being biased back to its open position (by now extended extension spring 222).

Note that although protrusion 242 is in the configuration of a peg in the figures, such is not a requirement. Any configuration may be employed for protrusion 242 as long as it is designed to engage with the shutter or another protrusion on the shutter. Note that it is possible to eliminate the protrusion on the shutter altogether (by allowing protrusion 242 on gear 204 to engage the shutter body directly).

The rotation of shutter 220 may be arrested or stopped when shutter 220 engages another protrusion on head housing 206. In the example of FIG. 3A, this protrusion is disposed at the bottom surface 252 of head housing 206 and is shown by reference number 250 (the protrusion itself is illustrated by hidden lines to denote the fact that it is obscured from view by head housing 206). One of ordinary skill in the art will recognize, given this disclosure, that this additional protrusion to stop the rotation of shutter 220 may be disposed at any suitable location, including at the top surface 254 of head housing 206.

To open shutter 220, gear 204 is rotated in the counterclockwise direction to move shutter 220 along the rotational axis linearly away from gear 204 to allow protrusions 240 and 242 to disengage from one another. One of ordinary skill in the art will recognize, given this disclosure, that the specific rotation direction may be reversed by, for example, using a standard right hand screw as the lead screw, to allow protrusions 240 and 242 to disengage by rotating gear 204 in the clockwise direction. The disengagement of these protrusions allows extension spring 222 to bias shutter 220 back to its open position (as shown in FIGS. 2A–2C). In one embodiment, the shutter 220 may be configured to open as the tape/leader ribbon 212 moves in the direction of arrow 260 to permit the friction between the tape/leader ribbon 212 and the surface of shutter 220 to assist in the opening of the shutter. The rotation of shutter 220 to its open position is arrested or stopped when shutter 220 engages another protrusion disposed at a suitable location on head housing 206. In the figures, this protrusion is shown by reference number 262 although like all protrusions discussed herein, it may assume any suitable configuration and may be mounted at any suitable location on head housing 206 to arrest the opening rotation of shutter 220.

As can be appreciated from the foregoing, the invention, in one embodiment, addresses the problems of ESD damage to the R/W head by automatically allowing the shutter to engage between the tape/leader ribbon and the R/W head. Advantageously, the invention does not require the use of sensors to ensure that the shutter rotates to the desired position (i.e., closed when the leader portion travels over the R/W head and open when the tape portion travels over the R/W head). As long as the length of the leader portion and the tape portion is known, the motor that drives the gear (e.g., gear 204) can be commanded to rotate to appropriately close or open the shutter as needed. Of course, the position of the tape may be ascertained by reading position data stored thereon to assist in deciding when the gear should be rotated to open or close the shutter. In another embodiment, the invention provides a mechanism for cleaning the R/W head by providing a cleaning material on the shutter surface so that the R/W head may be cleaned when it comes in contact with the shutter surface.

In yet another embodiment, the shutter can be urged to a closed position by the use of a cam that is mounted independent from the shutter and the head housing (i.e., the cam is mounted in the drive such that it does not move with the shutter and the head housing). It is contemplated that the cam may take the shape of, for example, a portion of a spiral ramp. As the head housing (along with the shutter) moves linearly along the axis of rotation of the lead screw toward the cam and contacts the cam's sloping surface, the sloping surface of the cam exerts a rotational force on the shutter to urge it to a closed position. Moving the head housing (and the shutter) away from the cam allows the sloping surface of the cam to disengage from the shutter and permits the bias arrangement (e g., a spring) to return the shutter to its open position. Additionally, since the rotating gear and the associated protrusions (on both the rotating gear and the head/shutter assembly) are no longer needed to move the shutter, the rotating gear and the associated protrusions can be omitted, allowing the motor to be coupled to the lead screw directly.

Figure 4:
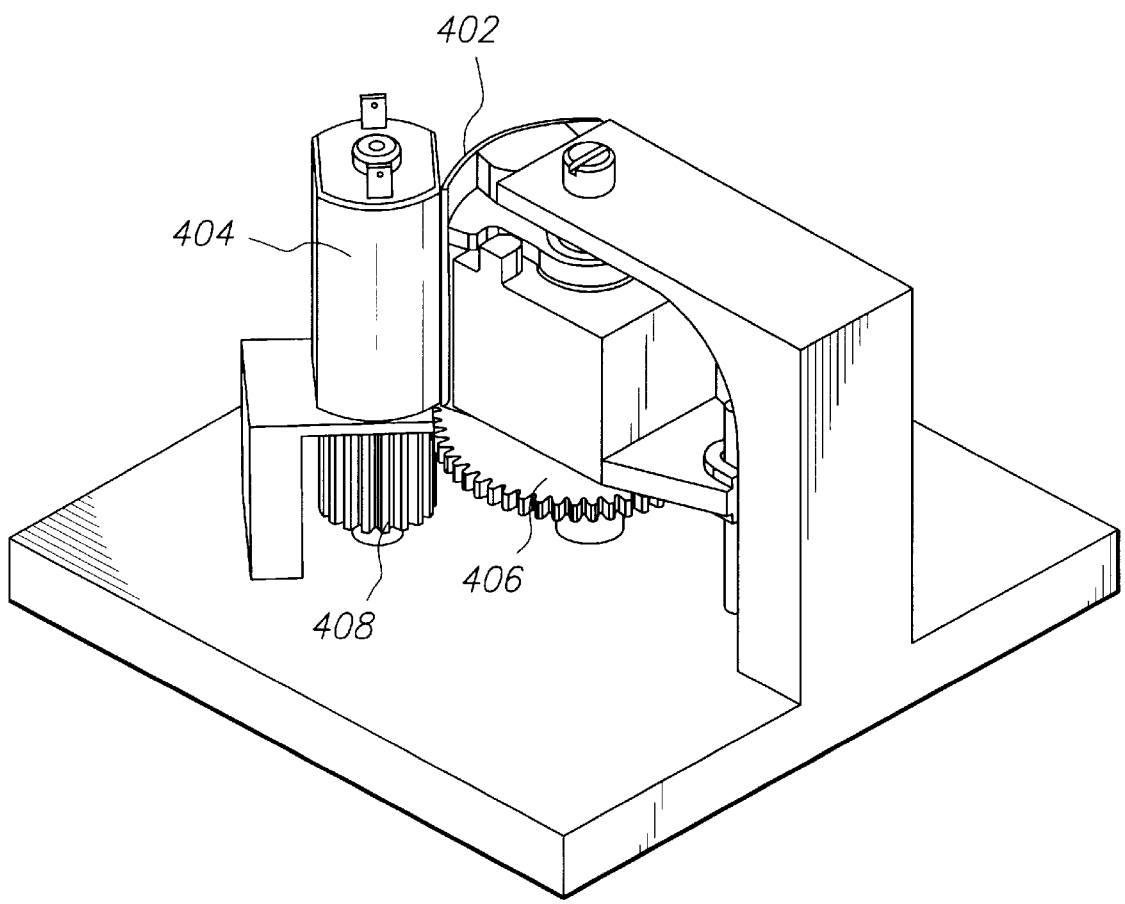
FIG. 4 conceptually illustrates yet another arrangement for moving the shutter between the open and closed position.

FIG. 4 conceptually illustrates yet another arrangement for moving the shutter between the open and closed position. In the arrangement of FIG. 4, shutter 402 may be rotated open and closed by motor 404 (which may be, for example, a stepper motor or a conventional DC motor) at any linear position of the assembly that comprises the head housing and R/W head. In contrast to the arrangement described in connection with FIGS. 2A–2C and 3A–3C, rotating gear 406 does not rotate with the lead screw. Instead, rotating gear 406 is coupled to shutter 404 and is rotated by motor 404. Rotating gear 406 is permitted to move linearly up or down along the rotation axis of the lead screw as the lead screw moves the head housing (and shutter 404) along its rotational axis. To close the shutter, motor 404 is engaged to rotate gear 408 in one direction, which in turn rotates gear 406 to urge the shutter to the closed position. To open the shutter, motor 404 is engaged to rotate gear 408 in the reverse direction, which in turn rotates gear 406 to return the shutter to the open position. In an alternate embodiment of FIG. 4, rotating gear 402 and shutter 404 may be decoupled from the head housing such that rotating gear 402 and shutter 404 do not move linearly along the axis of rotation of the lead screw as the lead screw linearly moves the head housing (and the R/W head). In this case, gear 406 does not move linearly (along the direction of the rotational axis) with reference to gear 408, allowing gear 408 to be shortened in length. As before, the opening and closing of shutter 402 is controlled by motor 404, permitting the shutter to be open or closed at any linear position of the assembly that comprises the head housing and the R/W head.

Although the present invention has been described with respect to the use of shutter to protect the R/W head from the leader material in a tape cartridge, it should be appreciated that the present invention may be advantageously employed with other types of readable or recordable media as well. For example, the present invention may also be implemented to shield the R/W head from any portion of the tape/leader ribbon that may cause damage to the R/W head. The present invention may also be applied to applications other than shielding the R/W head from leader-induced ESD damage. For example, the shutter may be used to shield the R/W head from a recording media when reading and writing of data is not taking place to minimize contamination of the R/W head (such as during high speed fast forward or rewind of the ribbon).

It should also be borne in mind that while this invention has been described in terms of several preferred embodiments, there are alterations, permutations, and equivalents that fall within the scope of this invention. For example, while the step of operating the shutter has been described as taking place when the tape is moving in the same direction as the desired direction of the shutter, it should be appreciated that in some instances, the tape could be moving in the opposite direction of the desired direction of the shutter. As another example, although the shutter and head assembly is moved linearly by a lead screw, other conventional linear actuator mechanisms (utilizing gear, friction, or electrical actuating means) may also be employed. Therefore, the present examples are to be considered as illustrative and not restrictive, and the invention is not to be limited to the details given herein, but may be modified within the scope of the appended claims.

In the claims:

1. A shutter/head assembly for reducing electrostatic discharge (ESD) damage to a read/write (R/W) head attached to said shutter/head assembly, said R/W head being configured to perform one of a storage operation and a retrieval operation on data stored on a tape/leader ribbon, comprising:
   a lead screw;
   a head housing configured to be coupled to said R/W head, said head housing being rotatably coupled to said lead screw;
   a shutter rotatably coupled to one of said lead screw and said head housing, said shutter being configured to be rotatable independently of said head housing, said shutter being configured to be disposed in a first radial position between said R/W head and said tape/leader ribbon when said shutter is brought toward a first linear position by said lead screw, said shutter being configured to be disposed in a second radial position that is away from between said R/W head and said tape/leader ribbon when said shutter is brought by said lead screw toward a second linear position that is different from said first linear position.

2. The shutter/head assembly of claim 1 further comprising a gear having thereon a first protrusion, said gear being coupled to said lead screw, said shutter further includes a second protrusion configured to engage said first protrusion to move said shutter into said first radial position as said gear rotates said lead screw to bring said head housing toward said first linear position.

3. The shutter/head assembly of claim 1 further comprising a gear having thereon a protrusion, said gear being coupled to said lead screw, said protrusion engages said shutter to move said shutter into said first radial position as said gear rotates said lead screw to bring said head housing toward said first linear position.

4. The shutter/head assembly of claim 1 further comprising a biasing arrangement, said biasing arrangement being configured to bias said shutter toward said second radial position.

5. The shutter/head assembly of claim 4, wherein said biasing arrangement has a first end and a second end, said first end being coupled to said shutter and said second end being coupled to said head housing.

6. The shutter/head assembly of claim 4, wherein said biasing arrangement is an extension spring.

7. The shutter/head assembly of claim 1, wherein said shutter is disposed in said first radial position when a leader segment of said tape/leader ribbon is disposed over said R/W head.

8. The shutter/head assembly of claim 1, wherein said shutter is disposed in said second radial position when a tape segment of said tape/leader ribbon is disposed over said R/W head.

9. The shutter/head assembly of claim 1, wherein said R/W head is a magneto-resistive (MR) head.

10. The shutter/head assembly of claim 1, wherein said R/W head is one of a ferrite head and a MIG head.

11. The shutter/head assembly of claim 1, wherein said shutter further comprises a R/W head cleaning material disposed on a surface of said shutter that faces said R/W head when said shutter is disposed in said first radial position.

12. A method for reducing electrostatic discharge (ESD) damage to a read/write (R/W) head attached to a shutter/head assembly, said R/W head being configured to perform one of a storage operation and a retrieval operation on data stored on a tape/leader ribbon, comprising:
   providing a lead screw;
   providing a head housing, said head housing being configured to be coupled to said R/W head;
   rotatably coupling said head housing to said lead screw;
   providing a shutter;
   rotatably coupling said shutter to one of said lead screw and said head housing, said shutter being configured to be rotatable independently of said head housing, said shutter being configured to be disposed in a first radial position between said R/W head and said tape/leader ribbon when said shutter is brought toward a first linear position by said lead screw, said shutter being configured to be disposed in a second radial position that is away from between said R/W head and said tape/leader ribbon when said shutter is brought by said lead screw toward a second linear position different from said first linear position.

13. The method of claim 12, further comprising:
   providing a gear having thereon a first protrusion;
   coupling said gear to said lead screw; and
   providing a second protrusion on said shutter, said first protrusion being configured to engage with said second protrusion to move said shutter into said first radial position when said shutter is brought by said lead screw toward said first linear position.

14. The method of claim 12, further comprising:
   providing a gear having thereon a protrusion; and
   coupling said gear to said lead screw, said protrusion being configured to engage with said shutter to move said shutter into said first radial position when said shutter is brought by said lead screw toward said first linear position.

15. The method of claim 12, further comprising coupling a biasing arrangement to said shutter, said biasing arrangement being configured to bias said shutter toward said second radial position.

16. The method of claim 15 wherein said biasing arrangement represents a torsion spring.

17. The method of claim 12, wherein said shutter is disposed in said first radial position when a leader segment of said tape/leader ribbon is disposed over said R/W head.

18. The method of claim 12, wherein said shutter is disposed in said second radial position when a tape segment of said tape/leader ribbon is disposed over said R/W head.

19. The method of claim 12, wherein said R/W head is a magneto-resistive (MR) head.

20. The method of claim 12, further comprising providing a R/W head cleaning material on a surface of said shutter that faces said R/W head when said shutter is disposed in said first radial position.

* * * * *